United States Patent
Suenaga et al.

(10) Patent No.: US 7,303,601 B2
(45) Date of Patent: *Dec. 4, 2007

(54) POLISHING COMPOSITION

(75) Inventors: Kenichi Suenaga, Wakayama (JP); Yoshiaki Oshima, Wakayama (JP); Toshiya Hagihara, Wakayama (JP)

(73) Assignee: Kao Corporation, Tokyo (JP)

( * ) Notice: Subject to any disclaimer, the term of this patent is extended or adjusted under 35 U.S.C. 154(b) by 48 days.

This patent is subject to a terminal disclaimer.

(21) Appl. No.: 10/727,571

(22) Filed: Dec. 5, 2003

(65) Prior Publication Data

US 2004/0127147 A1   Jul. 1, 2004

(30) Foreign Application Priority Data

Dec. 26, 2002  (JP) .......................... 2002-377288

(51) Int. Cl.
*C09G 1/02* (2006.01)
*B24B 1/00* (2006.01)

(52) U.S. Cl. .................... 51/308; 106/3; 510/165; 510/167; 451/41; 451/36

(58) Field of Classification Search .............. 51/308; 106/3; 438/692, 693
See application file for complete search history.

(56) References Cited

U.S. PATENT DOCUMENTS

| | | | |
|---|---|---|---|
| 5,389,194 A * | 2/1995 | Rostoker et al. ............. 134/1.3 |
| 6,551,175 B2 * | 4/2003 | Koichi et al. ................. 451/41 |
| 6,910,952 B2 * | 6/2005 | Suenaga et al. ............. 451/41 |
| 2002/0194789 A1 * | 12/2002 | Oshima ....................... 51/308 |
| 2003/0110711 A1 * | 6/2003 | Ota et al. ..................... 51/308 |
| 2004/0040217 A1 * | 3/2004 | Takashina et al. ............ 51/307 |
| 2004/0127046 A1 | 7/2004 | Takami |
| 2004/0127146 A1 * | 7/2004 | Oshima et al. .............. 451/36 |

FOREIGN PATENT DOCUMENTS

| | | |
|---|---|---|
| CN | 1384170 A | 12/2002 |
| GB | 2354769 A | 4/2001 |
| GB | 2375116 A | 11/2002 |
| JP | 2001-6162 A | 1/2001 |
| JP | 2001-323255 A | 11/2001 |
| JP | 2002-030274 A | 1/2002 |
| JP | 2002-294225 A | 10/2002 |
| JP | 2002-338951 A | 11/2002 |
| JP | 2002327170 | * 11/2002 |

* cited by examiner

*Primary Examiner*—Michael Marcheschi
(74) *Attorney, Agent, or Firm*—Birch, Stewart, Kolasch & Birch, LLP

(57) ABSTRACT

A polishing composition for memory hard disk containing water and silica particles, wherein the silica particles have a particle size distribution in which the relationship of a particle size (R) and a cumulative volume frequency (V) in a graph of particle size-cumulative volume frequency obtained by plotting a cumulative volume frequency (%) of the silica particles counted from a small particle size side against a particle size (nm) of the silica particles in the range of particle sizes of from 40 to 100 nm satisfy the following formula (1): $V \geq 0.5 \times R + 40$ (1), wherein the particle size is determined by observation with a transmission electron microscope (TEM). The polishing composition of the present invention can be even more suitably used for the manufacture of a substrate for precision parts such as substrates for memory hard disks.

12 Claims, 2 Drawing Sheets

US 7,303,601 B2

POLISHING COMPOSITION

This Nonprovisional application claims priority under 35 U.S.C. § 119(a) on Patent Application No. 2002-377288 filed in JAPAN on Dec. 26, 2002, the entire contents of which are hereby incorporated by reference.

FIELD OF THE INVENTION

The present invention relates to a polishing composition for a substrate for memory hard disk, a process for reducing surface roughness (TMS-Ra) of a substrate for memory hard disk with the polishing composition, and a process for manufacturing a substrate for memory hard disk with the polishing composition.

BACKGROUND OF THE INVENTION

In recent memory hard disk drives, high storage capacity and miniaturization have been demanded. In order to increase the recording density, it has been strongly urged to lower flying height of a magnetic head and to reduce the unit recording area. Along with this trend, the surface quality required after polishing has become severely assessed every year even in a process for manufacturing a substrate for a memory hard disk. Because of the lowering of flying height of the magnetic head, the surface roughness, the fine waviness, the roll-off and projections are reduced, and because of miniaturization in unit recording area, the sizes and depths of the scratches and pits are decreased.

In order to meet such requirements, there has been proposed a polishing composition containing silica particles as abrasive particles having a specified particle size distribution (for instance, Japanese Patent Laid-Open No. 2002-30274).

It is disclosed in the publication that according to the above-mentioned polishing composition, since colloidal silica particles having different mono-modal number particle size distributions are contained, an aluminum disk substrate having small average waviness and a few surface defects can be obtained.

However, in the above polishing composition, a sufficient reduction in the surface roughness of the substrate for a memory hard disk cannot yet be achieved from the viewpoint of TMS-Ra which can evaluate the surface roughness of the entire substrate.

SUMMARY OF THE INVENTION

The present invention relates to:
[1] a polishing composition for memory hard disk containing water and silica particles, wherein the silica particles have a particle size distribution in which a relationship of a particle size (R) and a cumulative volume frequency (V) in a graph of particle size-cumulative volume frequency obtained by plotting a cumulative volume frequency (%) of the silica particles counted from a small particle size side against a particle size (nm) of the silica particles in a range of particle sizes of from 40 to 100 nm satisfy the following formula (1):

$$V \geq 0.5 \times R + 40 \quad (1)$$

wherein the particle size is determined by observation with a transmission electron microscope (TEM);
[2] a process for reducing surface roughness (TMS-Ra) of a substrate for memory hard disk including the step of polishing a substrate for memory hard disk with the polishing composition of any one of the above [1]; and
[3] a method for manufacturing an Ni—P plated substrate for memory hard disk, including the step of polishing an Ni—P plated substrate for memory hard disk with the polishing composition of the above [1].

DETAILED DESCRIPTION OF THE INVENTION

Figure 1:
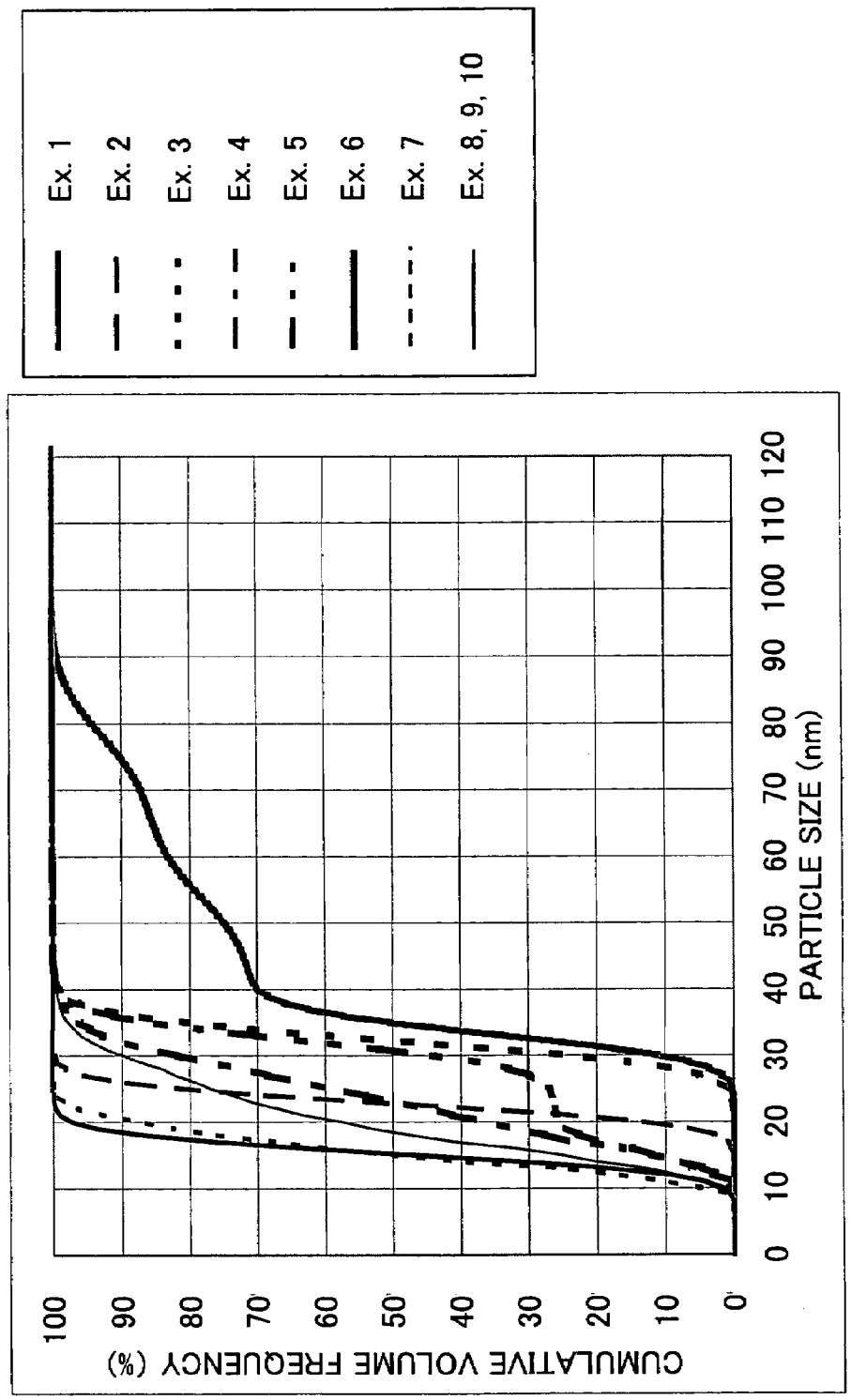
FIG. 1 is a graph for particle size-cumulative volume frequency of silica particles used in each Example.

All publications cited herein are hereby incorporated by reference.

The present invention relates to a polishing composition capable of reducing surface roughness (TMS-Ra) of the surface of the substrate for memory hard disk to a practically sufficient level; a process for reducing surface roughness (TMS-Ra) of a substrate for memory hard disk with the polishing composition; and a method for manufacturing an Ni—P plated substrate for memory hard disk with the polishing composition.

The polishing composition of the present invention is a polishing composition for a substrate for memory hard disk (hereinafter referred to as a substrate for a disk), containing water and specific silica particles as an abrasive.

The silica particles used in the present invention have a specific particle size distribution in which the relationship of a particle size (R) and a cumulative volume frequency (V) satisfies the above-mentioned formula (1) in a graph of particle size-cumulative volume frequency obtained by plotting a cumulative volume frequency (%) of the silica particles counted from a small particle size side against a particle size (nm) of the silica particles in the range of particle sizes of from 40 to 100 nm. One of the great features of the polishing composition of the present invention resides in that the polishing composition contains the silica particles as an abrasive. Since the polishing composition has the above constitution, the surface roughness (TMS-Ra) of a substrate for a disk can be sufficiently reduced to a practical usable level. Accordingly, the surface of the substrate for a disk polished with the polishing composition of the present invention has excellent smoothness.

In the present specification, the term "the surface roughness" (TMS-Ra) refers to the surface roughness [Ra (Å)] of an object to be polished (hereinafter referred as an object), which is detected by a light scattering-type surface roughness measuring machine: TMS-2000RC (commercially available from Schmitt Measurement Systems, Inc.).

Specifically, the surface roughness (TMS-Ra) shows a rugged state without taking account for the waviness of the surface of the object, and the surface roughness can be an index showing an extent for the surface smoothness of the object. The smaller the surface roughness (TMS-Ra), the more excellent the surface smoothness of the object.

Generally, the surface roughness of the object is determined as an average of various parts, which are picked up randomly from the surface of the object. The surface roughness is not uniform in individual positions of the surface of the object and usually shows a considerably large variance. Accordingly, in order to obtain the surface roughness of the object, the measurement positions and the number of measurements must be determined, so that the its population mean can be effectively deduced. Therefore, the reliability of the data greatly depends on the selection of the measurement positions and the number of measurements.

On the other hand, the above-mentioned measuring machine used for the determination of the surface roughness (TMS-Ra) in the present invention can uniformly measure almost an entire region of the surface to be measured of the object, and the surface roughness is determined as an average of the obtained entire data. Therefore, the data for the surface roughness obtained by the above-mentioned measuring machine have higher reliability than the data obtained by a conventional method of measuring the surface roughness. The details for the measuring method of the surface roughness (TMS-Ra) are described in Examples set forth below.

The silica particles used in the present invention include, for instance, colloidal silica particles, fumed silica particles, the surface-modified silica particles, and the like. Among them, the colloidal silica particles are preferable, from the viewpoint of obtaining a surface of the disk substrate having higher smoothness. The colloidal silica particles can be commercially available, or can be prepared from an aqueous silicic acid by a known preparation process. The silica particles are preferably used in the form of a slurry.

The particle size distribution of the above mentioned silica particles can be determined by the method described below. Specifically, photographs of the silica particles observed by a transmission electron microscope "JEM-2000 FX" commercially available from JEOL LTD. (80 kV, magnification: 10000 to 50000) are incorporated into a personal computer as image data with a scanner connected thereto. The projected area diameter of individual silica particles is determined using an analysis software "Win-ROOF" (commercially available from MITANI CORPORATION), and considered as the diameter of the silica particles. After analyzing data for 1000 or more silica particles, the volume of the silica particles are calculated from the diameters of the silica particles based on the analyzed data using a spreadsheet software "EXCEL" (commercially available from Microsoft Corporation).

Based on the data for the particle size distribution of the silica particles obtained as mentioned above, a ratio of particles having a given particle size (% based volume) is expressed as cumulative frequency counted from a small particle size side in the entire particles, and a cumulative volume frequency (%) is obtained.

Based on the particle size and the data for the cumulative volume frequency of the silica particles obtained as mentioned above, a graph of particle size-cumulative volume frequency is obtained by plotting the cumulative volume frequency against the particle size.

The silica particles of the present invention have a particle size distribution, in which a relationship of the cumulative volume frequency (V) and the particle size (R) in the graph of particle size-cumulative volume frequency satisfies the above-mentioned formula (1) within a range of particle sizes of from 40 to 100 nm. From the viewpoint of reducing the surface roughness (TMS-Ra) of the surface of the substrate for a disk, thereby improving the surface smoothness of the substrate, preferable are those having a particle size distribution so that the relationship of V and R satisfies the following formula (2):

$$V \geq 1 \times R + 20 \qquad (2)$$

within the range of the particle size from 40 to 70 nm, more preferably those having a particle size distribution so that the relationship of V and R satisfies the following formula (3):

$$V \geq 1.5 \times R \qquad (3)$$

within the range of the particle size from 40 to 60 nm, even more preferably those having a particle size distribution so that the relationship of V and R satisfies the following formula (4):

$$V \geq 3 \times R - 60 \qquad (4)$$

within the range of the particle size from 40 to 50 nm, even more preferably those having a particle size distribution so that the relationship of V and R satisfies the following formula (5):

$$V \geq R + 50 \qquad (5)$$

within the range of the particle size from 40 to 45 nm. In addition, from the viewpoint of the polishing rate, preferable are those having a particle size distribution so that the relationship of V and R satisfies the following formula (6):

$$V \leq 8R + 5 \qquad (6)$$

within the range of the particle size from 1 to 3 nm.

The silica particles used in the present invention may be those composed of one kind of silica particles having a specified particle size distribution, or an admixture of two or more kinds of silica particles having different particle size distributions, as long as the silica particles have the particle size distributions as defined above.

The method for adjusting the particle size distribution of the silica particles is not particularly limited. For instance, in the case where the silica particles are colloidal silica particles, the method includes a method of giving the particle size distribution in a final product by adding the particles which can serve as a new core during the process of particle growth in the preparation steps, or the method including the step of mixing two or more silica particles having different particle size distributions.

As the abrasive, the abrasives that are generally used for polishing can be used in addition to the above-mentioned silica particles. The abrasive includes metals; carbides of metals or metalloids, nitrides of metals or metalloids, oxides of metals or metalloids or borides of metals or metalloids; diamond, and the like. The elements for metals or metalloids include those elements belonging to the Group 2A, 2B, 3A, 3B, 4A, 4B, 5A, 6A, 7A or 8 of the Periodic Table (long period form). Concrete examples of the abrasives include aluminum oxide, silicon carbide, diamond, magnesium oxide, zinc oxide, titanium oxide, cerium oxide, zirconium oxide and the like. It is preferable to use one or more kinds of these abrasives from the viewpoint of increasing the polishing rate. Among them, aluminum oxide, cerium oxide, zirconium oxide and titanium oxide are suitable for polishing a substrate of precision parts, such as substrates for magnetic recording media. As to aluminum oxide, various crystal systems such as α, θ and γ are known, and they can properly be used and selected as occasion demands.

The particle size of the abrasive particles other than the silica particles is preferably as the same as that of the above-mentioned silica particles, from the viewpoint of the surface quality.

The content of the abrasive containing silica particles is preferably 0.5% by weight or more, more preferably 1% by weight or more, even more preferably 3% by weight or more, even more preferably 5% by weight or more, of the polishing composition, from the viewpoint of improving the polishing rate, and the content is preferably 20% by weight or less, more preferably 15% by weight or less, even more preferably 13% by weight or less, even more preferably 10% by weight or less, of the polishing composition, from the viewpoints of improving the surface quality and having economic advantages. Accordingly, the content is preferably from 0.5 to 20% by weight, more preferably from 1 to 15% by weight, even more preferably from 3 to 13% by weight, even more preferably from 5 to 10% by weight, of the polishing composition.

In addition, since the polishing composition of the present invention further contains at least one member selected from the group consisting of acids, salts thereof and oxidizing agents, more excellent effects of the present invention can be exhibited. These can be used as a mixture thereof.

In addition, it is preferable that the polishing composition of the present invention contains an oxidizing agent from the viewpoint of improving the polishing rate. The oxidizing agent includes peroxides, permanganic acid or salts thereof, chromic acid or salts thereof, peroxo acid or salts thereof, oxyacid or salts thereof, metal salts, sulfuric acid, and the like.

The above-mentioned peroxide includes hydrogen peroxide, sodium peroxide, barium peroxide, and the like; the permanganic acid or salts thereof include potassium permanganate, and the like; the chromic acid or salts thereof include metal salts of chromic acid, metal salts of dichromic acid, and the like; the peroxo acid or salts thereof include peroxodisulfuric acid, ammonium peroxodisulfate, metal salts of peroxodisulfuric acid, peroxophosphoric acid, peroxosulfuric acid, sodium peroxoborate, performic acid, peracetic acid, perbenzoic acid, perphthalic acid, and the like; oxyacid or salts thereof include hypochlorous acid, hypobromous acid, hypoiodous acid, chloric acid, bromic acid, iodic acid, sodium periodate, sodium hypochlorate, calcium hypochlorate, and the like; metal salts include iron (III) chloride, iron (III) sulfate, iron (III) citrate, ammonium iron (III) sulfate, and the like. The preferred oxidizing agent includes hydrogen peroxide, iron (III) nitrate, peracetic acid, ammonium peroxodisulfate, iron (III) sulfate, ammonium iron (III) sulfate and the like. Especially hydrogen peroxide is preferable, from the viewpoints of being widely used and inexpensive without depositing metal ions to the surface of the substrate. These oxidizing agents can be used alone or in admixture of two or more kinds.

The content of the oxidizing agent is preferably 0.002% by weight or more, more preferably 0.005% by weight or more, even more preferably 0.007% by weight or more, even more preferably 0.01% by weight or more, of the polishing composition, from the viewpoint of increasing the polishing rate. Also, the content is preferably 20% by weight or less, more preferably 15% by weight or less, even more preferably 10% by weight or less, even more preferably 5% by weight or less, of the polishing composition, from the viewpoints of reducing the surface roughness and the waviness, and reducing the surface defects such as pits and scratches, thereby improving the surface quality, and from the viewpoint of economic advantages. The content is preferably from 0.002 to 20% by weight, more preferably from 0.005 to 15% by weight, even more preferably from 0.007 to 10% by weight, even more preferably from 0.01 to 5% by weight, of the polishing composition.

It is preferable that the polishing composition of the present invention contains an acid and/or a salt thereof, from the viewpoint of further increasing the polishing rate. As the acid and/or salt thereof, those compounds of which acidic form has pK1 of 2 or less are preferable. It is desired that the pK1 is 1.5 or less, more preferably 1 or less, even more preferably those having such strong acidity that cannot be expressed by pK1, from the viewpoint of reducing fine scratches. Examples thereof include an inorganic acid, such as nitric acid, sulfuric acid, sulfurous acid, persulfuric acid, hydrochloric acid, perchloric acid, phosphoric acid, phosphonic acid, phosphinic acid, pyrophosphoric acid, tripolyphosphoric acid, or amide sulfuric acid, and a salt thereof; organic phosphonic acid, such as 2-aminoethylphosphonic acid, 1-hydroxyethylidene-1,1-diphosphonic acid, aminotri(methylenephosphonic acid), ethylenediaminetetra(methylenephosphonic acid), diethylenetriaminepenta(methylenephosphonic acid), ethane-1,1-diphosphonic acid, ethane-1,1,2-triphosphonic acid, ethane-1-hydroxy-1,1-diphosphonic acid, ethane-1-hydroxy-1,1,2-triphosphonic acid, ethane-1,2-dicarboxy-1,2-diphosphonic acid, methanehydroxyphosphonic acid, 2-phosphonobutane-1,2-dicarboxylic acid, 1-phosphonobutane-2,3,4-tricarboxylic acid, α-methylphosphonosuccinic acid, and a salt thereof; an aminocarboxylic acid, such as glutamic acid, picolinic acid, or aspartic acid, and a salt thereof; a carboxylic acid, such as oxalic acid, nitroacetic acid, maleic acid, or oxaloacetic acid, and a salt thereof; and the like. Among them, the inorganic acids, the organic phosphonic acids, and salts thereof are preferable, from the viewpoint of reducing the fine scratches. Among the inorganic acid and a salt thereof, nitric acid, sulfuric acid, hydrochloric acid, perchloric acid and salts thereof are more preferable. Among the organic phosphonic acid and a salt thereof, 1-hydroxyethylidene-1,1-diphosphonic acid, aminotri(methylenephosphonic acid), ethylenediaminetetra(methylenephosphonic acid), diethylenetriaminepenta(methylenephosphonic acid), and salts thereof are more preferable. These acids and salts can be used alone or in admixture of two or more kinds. Here, pK1 is defined as follows: A logarithmic value of an inverse of an acid dissociation constant (at 25° C.) of an organic compound or an inorganic compound is usually expressed as pKa, and a logarithmic value of an inverse of a first acid dissociation constant is defined as pK1. The pK1 of each compound is listed in, for instance, in *Kagaku Binran (Kiso-hen)* II, Fourth Revision, pp. 316-325 (Edit. by Nippon Kagakukai), and the like. In the present invention, it is even more preferable to use those acids having pK1 of 2 or less and/or a salt thereof, from the viewpoint of satisfying both reduction of fine scratches and increase in the polishing rate.

The salts of these acids are not particularly limited. Examples thereof include salts with a metal, ammonium, an alkylammonium, an organic amine or the like. Concrete examples of the metals include those metals belonging to the Group 1A, 1B, 2A, 2B, 3A, 3B, 4A, 6A, 7A or 8 of the Periodic Table (long period form). Among them, the salt with the metal belonging to Group 1A or with ammonium is preferable, from the viewpoint of reducing the fine scratches.

The content of the above-mentioned acid and the salt thereof is preferably from 0.0001 to 5% by weight, more preferably from 0.0003 to 4% by weight, even more preferably from 0.001 to 3% by weight, even more preferably from 0.0025 to 2.5% by weight, of the polishing composition, from the viewpoint of exhibiting sufficient polishing rate and from the viewpoint of improving the surface quality.

Water in the polishing composition of the present invention is used as a medium. For instance, distilled water, ion exchanged water, ultrapure water or the like is used. From the viewpoint of efficiently polishing the object to be polished, the water content is preferably 55% by weight or more, more preferably 67% by weight or more, even more preferably 75% by weight or more, even more preferably 84% by weight or more, of the polishing composition, and the water content is preferably 99.4979% by weight or less, more preferably 98.9947% by weight or less, even more preferably 96.992% by weight or less, even more preferably 94.9875% by weight or less, of the polishing composition. The water content is preferably from 55 to 99.4979% by weight, more preferably from 67 to 98.9947% by weight, even more preferably from 75 to 96.992% by weight, even more preferably from 84 to 94.9875% by weight.

The concentration of each component of the above-mentioned polishing composition may be any of the concentration during the preparation of the composition and the concentration upon use. In many cases, the polishing composition is usually prepared as a concentrate, which is diluted upon use.

In addition, there can be added other component to the polishing composition of the present invention as occasion demands. The other component includes thickeners, dispersing agents, anticorrosive agents, basic substances, surfactants, and the like.

The polishing composition of the present invention can be prepared by mixing the above-mentioned abrasive and water, and optionally, an oxidizing agent, an acid and/or a salt thereof, and other components by a known method.

It is preferable that the pH of the polishing composition of the present invention is appropriately determined depending upon the kinds of the objects to be polished and the required properties. Although the pH of the polishing composition cannot be absolutely determined because it differs depending upon the materials of the objects to be polished, it is desirable that the pH generally in metal materials is acidic, preferably less than 7, more preferably 6 or less, even more preferably 5 or less, even more preferably 4 or less, from the viewpoint of increasing the polishing rate. In addition, the pH is preferably 1 or more, more preferably 1.1 or more, even more preferably 1.2 or more, even more preferably 1.3 or more, from the viewpoints of influence to a human body and corrosivity of the machine. Especially in the substrate for precision parts made of a metal such as an aluminum alloy substrate plated with nickel-phosphorus (Ni—P), it is preferable that the pH is acidic, and that the pH is preferably 4.5 or less, more preferably 4 or less, even more preferably 3.5 or less, even more preferably 3 or less, from the viewpoint of increasing the polishing rate. Therefore, although the pH may be set in accordance with the purpose which is to be considered important, even more in the substrate for precision parts made of a metal such as an aluminum alloy substrate plated with Ni—P, the pH is preferably from 1 to 4.5, more preferably from 1.1 to 4, even more preferably from 1.2 to 3.5, even more preferably from 1.3 to 3, from the total viewpoints mentioned above. The pH can be adjusted by properly adding an inorganic acid such as nitric acid or sulfuric acid, an organic acid such as oxalic acid, an ammonium salt, or a basic substance such as an aqueous ammonia, potassium hydroxide, sodium hydroxide or an amine in a desired amount.

The process for reducing surface roughness (TMS-Ra) of a substrate for a disk of the present invention includes a process including the step of applying the polishing composition of the present invention to a substrate to be polished when polishing. The polishing process for a substrate to be polished includes a polishing process including the step of applying the polishing composition of the present invention to a substrate to be polished, or applying to a substrate to be polished the polishing composition prepared by mixing each component so as to have the same composition as the polishing composition of the present invention, and the process can be even more suitably used for the manufacture of a substrate for precision parts, such as a substrate for a memory hard disk. In addition, the polishing composition of the present invention can remarkably reduce the surface roughness (TMS-Ra) of the substrate for a disk, thereby exhibiting high polishing rate.

The material for an object to be polished by the polishing composition of the present invention includes, for instance, metals or metalloids such as silicon, aluminum, nickel, tungsten, copper, tantalum and titanium, and alloys thereof; glassy substances such as glass, glassy carbon and amorphous carbons; ceramic materials such as alumina, silicon dioxide, silicon nitride, tantalum nitride, and titanium carbide; resins such as polyimide resins; and the like. Among them, an object to be polished is preferably made of a metal such as aluminum, nickel, tungsten or copper, or made of an alloy containing these metals as the main components, for instance, an aluminum alloy substrate plated with Ni—P is more preferable.

The polishing process of a substrate for a disk according to the process for reducing the surface roughness (TMS-Ra) of a substrate for a disk in the present invention, for instance, can be suitably carried out by using a known polishing machine. For instance, the polishing process is carried out by the steps of setting a substrate for a disk between polishing platens to which a nonwoven polishing pad made of an organic polymer or the like, preferably made of polyurethane, is attached; feeding a polishing composition in an amount of from 1 to 30 mL/min, preferably from 3 to 20 mL/min as a flow rate, per one substrate for a disk with a diameter of 95 mm to the surface of a substrate to be polished; moving the polishing platens and the substrate for a disk so that a relative rate between an upper platen or a lower platen and a substrate for a disk is usually from 0.1 to 2 m/sec, preferably from 0.3 to 1 m/sec at the center of the platens, with applying a given pressure of usually from 2.9 to 14.7 kPa, preferably from 4.9 to 10.8 kPa as a load.

According to the method for reducing the surface roughness of a substrate for a disk as mentioned-above, the surface roughness of the surface of a substrate for a disk is efficiently reduced, and the surface smoothness of the surface of a substrate for a disk is sufficiently obtained for practical use.

In addition, as one of embodiment of the present invention, there is provided a method for manufacturing a substrate for a disk including the step of polishing a substrate with the polishing composition of the present invention, even more a method for manufacturing a substrate for a disk including the step of polishing a substrate plated with Ni—P with the polishing composition of the present invention.

The method for manufacturing a substrate plated with Ni—P of the present invention (hereinafter referred to as the method for manufacturing a substrate for a disk), includes the step of polishing the substrate with the polishing composition of the present invention. This step is preferably carried out in the second step or subsequent steps among the plural polishing step, and more preferably in the final polishing step. For instance, the substrate of which surface roughness (TMS-Ra) is made into from 15 to 30 Å obtained in the first polishing step or the second polishing step, in which the polishing liquid containing a known abrasive, such as alumina abrasive grains, is used, is further polished by the polishing process with the polishing composition of the present invention. The polishing step using the polishing composition of the present invention may be carried out in the same manner as the above-mentioned process for reducing surface roughness of a substrate for a disk.

In the method for manufacturing a substrate for a disk of the present invention, when it is desired to manufacture a substrate for a disk having the surface roughness (TMS-Ra) of preferably 0.8 Å or less, more preferably 0.75 Å or less, in the polishing process including only two steps, the polishing process for a substrate for a disk with the polishing composition of the present invention is suitably applied as the second polishing step.

According to the method for manufacturing a substrate for a disk of the present invention, an Ni—P plated substrate for a disk, having a surface roughness (TMS-Ra) of preferably 0.8 Å or less, more preferably 0.75 Å or less and having an excellent surface smoothness can be efficiently manufactured.

Since the substrate for a disk has a very smooth surface, when the substrate is used as a substrate for a memory hard disk, there can be achieved lowering of a flying height of a magnetic head, leading to higher capacity and miniaturization for the disk.

EXAMPLES

The following examples further describe and demonstrate embodiments of the present invention. The examples are given solely for the purposes of illustration and are not to be construed as limitations of the present invention.

Each of the polishing compositions obtained in the following Examples and Comparative Examples was evaluated for its polishing properties by using an Ni—P plated, aluminum alloy substrate having a thickness of 1.27 mm, and a diameter of 95 mm, which was previously roughly polished with a polishing liquid containing alumina abrasives so that the substrate had a surface roughness (TMS-Ra) of 20 Å as an object to be polished.

Examples 1 to 10 and Comparative Examples 1 to 7

There were added together the colloidal silicas shown in Table 1 (Silicas A to H), hydrogen peroxide ($H_2O_2$), HEDP (1-hydroxyethylidene-1,1-diphosphonic acid) and balance water (ion-exchanged water) with mixing, to give each of the polishing compositions having the composition as shown in Table 1. The order of adding is as follows: A 35% by weight aqueous hydrogen peroxide was added to an aqueous solution prepared by diluting HEDP in water, thereafter other components were added thereto as desired, and a colloidal silica slurry was finally added to the mixture obtained with cautiously stirring not to cause gelation, to give a polishing composition.

TABLE 1

| | Composition of Polishing Composition (% by weight) | | | | | | | | | | | | |
|---|---|---|---|---|---|---|---|---|---|---|---|---|---|
| | Silica Particles | | | | | | | | Oxidizing Agent | | Acid | | |
| | Silica A | Silica B | Silica C | Silica D | Silica E | Silica F | Silica G | Silica H | $H_2O_2$ | $NaIO_4$ | HEDP | $H_2SO_4$ | pH |
| Ex. No. | | | | | | | | | | | | | |
| Ex. 1 | 7.00 | — | — | — | — | — | — | — | 0.6 | — | 2.0 | — | 1.5 |
| Ex. 2 | — | 7.00 | — | — | — | — | — | — | 0.6 | — | 2.0 | — | 1.5 |
| Ex. 3 | — | — | 7.00 | — | — | — | — | — | 0.6 | — | 2.0 | — | 1.5 |
| Ex. 4 | — | — | — | — | — | 7.00 | — | — | 0.6 | — | 2.0 | — | 1.5 |
| Ex. 5 | 1.75 | — | 5.25 | — | — | — | — | — | 0.6 | — | 2.0 | — | 1.5 |
| Ex. 6 | — | — | 4.90 | 1.05 | 1.05 | — | — | — | 0.6 | — | 2.0 | — | 1.5 |
| Ex. 7 | — | — | — | — | — | — | — | 7.00 | 0.6 | — | 2.0 | — | 1.5 |
| Ex. 8 | — | — | — | — | — | — | 3.50 | 3.50 | 0.6 | — | 2.0 | — | 1.5 |
| Ex. 9 | — | — | — | — | — | — | 3.50 | 3.50 | — | 3.8 | 2.0 | — | 1.5 |
| Ex. 10 | — | — | — | — | — | — | 3.50 | 3.50 | 0.6 | — | 0.14 | 0.56 | 1.1 |
| Comp. Ex. No. | | | | | | | | | | | | | |
| Comp. Ex. 1 | 0.27 | — | 1.35 | — | — | 5.38 | — | — | 0.6 | — | 2.0 | — | 1.5 |
| Comp. Ex. 2 | 1.40 | — | — | 5.60 | — | — | — | — | 0.6 | — | 2.0 | — | 1.5 |
| Comp. Ex. 3 | — | — | 3.50 | 3.50 | — | — | — | — | 0.6 | — | 2.0 | — | 1.5 |
| Comp. Ex. 4 | — | — | 1.40 | — | — | 5.60 | — | — | 0.6 | — | 2.0 | — | 1.5 |
| Comp. Ex. 5 | — | — | 5.60 | — | — | 1.40 | — | — | 0.6 | — | 2.0 | — | 1.5 |
| Comp. Ex. 6 | 1.75 | — | — | 4.20 | — | 1.05 | — | — | 0.6 | — | 2.0 | — | 1.5 |

TABLE 1-continued

| | Composition of Polishing Composition (% by weight) | | | | | | | | | | | |
|---|---|---|---|---|---|---|---|---|---|---|---|---|
| | Silica Particles | | | | | | | | Oxidizing Agent | | Acid | |
| | Silica A | Silica B | Silica C | Silica D | Silica E | Silica F | Silica G | Silica H | $H_2O_2$ | $NaIO_4$ | HEDP | $H_2SO_4$ | pH |
| Comp. Ex. 7 | — | — | — | 1.75 | — | 5.25 | — | — | 0.6 | — | 2.0 | — | 1.5 |

* Notes from Table 1:
Silica A: Cataloid SI-30 (commercially available from CATALYSTS & CHEMICALS INDUSTRIES CO., LTD.)
Silica B: Cataloid SI-40 (commercially available from CATALYSTS & CHEMICALS INDUSTRIES CO., LTD.)
Silica C: Cataloid SI-50 (commercially available from CATALYSTS & CHEMICALS INDUSTRIES CO., LTD.)
Silica D: Cataloid SI-45P (commercially available from CATALYSTS & CHEMICALS INDUSTRIES CO., LTD.)
Silica E: Laboratory sample from CATALYSTS & CHEMICALS INDUSTRIES CO., LTD.
Silica F: Cataloid SI-80P (commercially available from CATALYSTS & CHEMICALS INDUSTRIES CO., LTD.)
Silica G: Syton 524 (commercially available from Du Pont K.K.)
Silica H: Syton HS40 (commercially available from Du Pont K.K.)
$H_2O_2$: 35% by weight aqueous hydrogen peroxide (commercially available from ASAHI DENKA KOGYO K.K.)
$NaIO_4$: Sodium periodate (commercially available from Wako Pure Chemical Industries, Ltd.)
HEDP: 1-Hydroxyethylidene-1,1-diphosphonic acid "Dequest 2010" (commercially available from SOLUTIA JAPAN INC.)
$H_2SO_4$: Sulfuric acid (commercially available from Wako Pure Chemical Industries, Ltd.)

Figure 2:
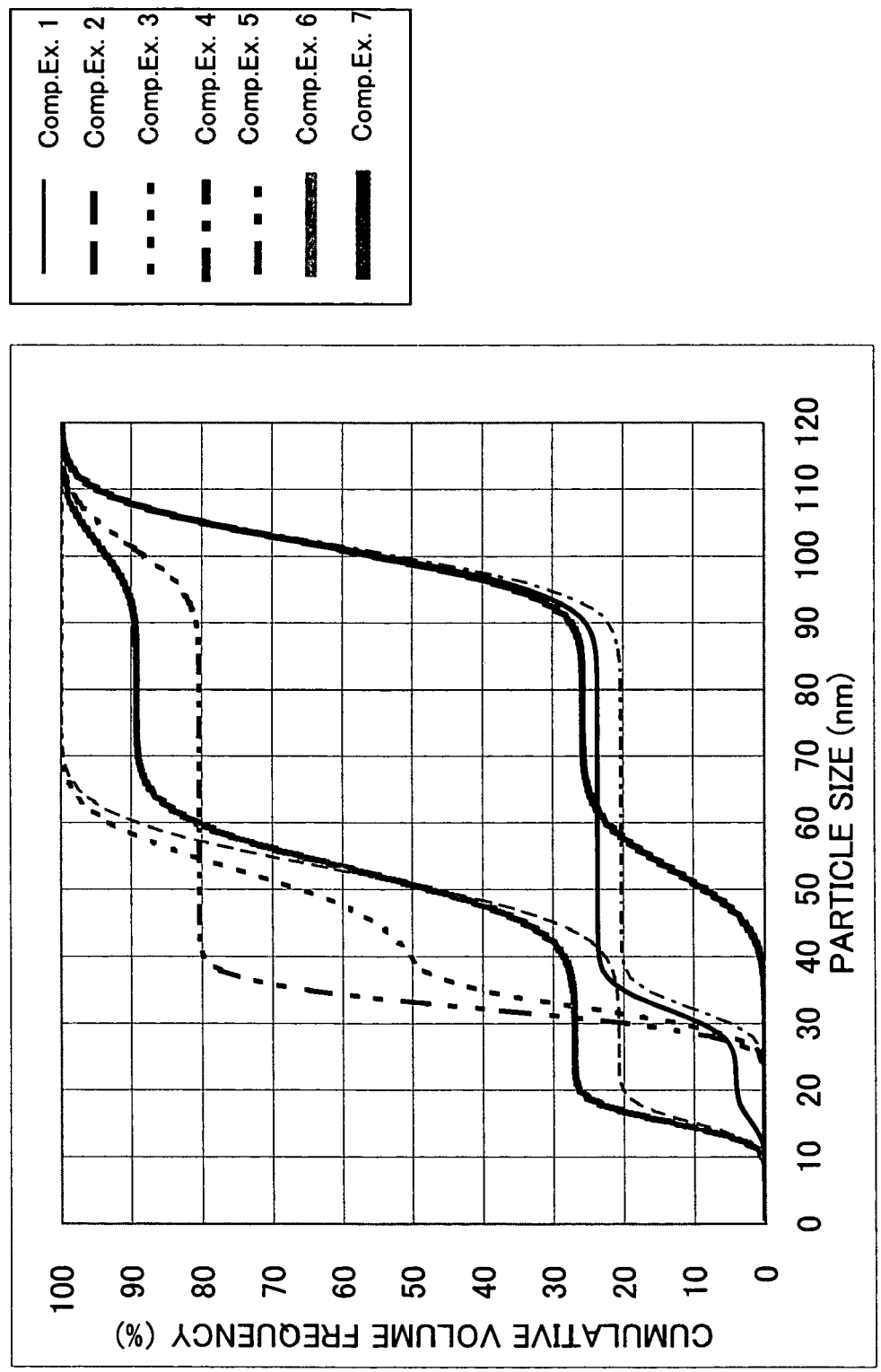
FIG. 2 is a graph for particle size-cumulative volume frequency of silica particles used in each Comparative Example.

With regard to each of the silica particles constituting the above-mentioned Silicas A to H or a mixture thereof used in the preparation of the above-mentioned polishing composition, the particle size of the silica particles was determined in accordance with the following method for "Determination of Particle Size Distribution of Silica Particles." The cumulative volume frequency of the particle size was obtained, and a graph of particle size-cumulative volume frequency was plotted. The graph of the particle size-cumulative volume frequency of the silica particles used in each of Examples is shown in FIG. 1, and the graph of the particle size-cumulative volume frequency of the silica particles used in each of Comparative Examples is shown in FIG. 2.

[Determination of Particle Size Distribution of Silica Particles]

Using silica particles in the form of slurry as a sample, the sample was observed with a transmission electron microscope "JEM-2000FX" commercially available from JEOL, LTD. (80 kV, magnification: 10000 to 50000 times) in accordance with the instruction manual attached by the manufacturer of the microscope, and its TEM image was photographed. Each of the photographs was incorporated into a personal computer as image data with a scanner connected thereto. The projected area diameter of individual silica particles was determined using an analysis software "WinROOF" (commercially available from MITANI CORPORATION), and considered as the diameter of silica particles. After analyzing data for 1000 or more silica particles, the volume of silica particles were calculated from the diameters of the silica particles based on the analyzed data using a spreadsheet software "EXCEL" (commercially available from Microsoft Corporation).

On the bases of the particle size distribution data of the silica particles obtained as described above, a proportion (% on volume basis) of the particles having a given particle size is expressed as a cumulative frequency of the silica particles counted from a small particle size side in the entire particles, to give a cumulative volume frequency (%).

On the bases of the particle sizes of the silica particles and the data for the cumulative volume frequency obtained as described above, the cumulative volume frequency was plotted against the particle size, to give a graph of particle size-cumulative volume frequency.

In addition, an object to be polished was polished with each of the polishing compositions of Examples 1 to 10 and Comparative Examples 1 to 7 under the following polishing conditions. Next, the surface roughness (TMS-Ra) of the surface of the object to be polished was determined in accordance with the following method, and evaluated. The evaluation was made on 10 objects to be polished for each of Examples and Comparative Examples, and the surface roughness (TMS-Ra) was an average of individual data obtained with each of objects to be polished. The results are shown in Table 2.

(Polishing Conditions)
Polishing testing machine: double-sided processing machine, Model 9B, commercially available from SPEEDFAM CO., LTD.
Polishing pad: "Bellatrix N0058" manufactured by Kanebo, LTD.
Processing pressure: 7.8 kPa
Feeding amount for a slurry: 100 mL/min
Rotational speed of a lower platen: 30 r/min
Polishing time period: 4 minutes
Number of substrates introduced: 10

[Determination of Surface Roughness (TMS-Ra)]

The surface roughness (TMS-Ra) was determined with a light scattering-type surface roughness measuring machine "TMS-2000RC" (commercially available from Schmitt Measurement Systems, Inc.) in accordance with the instruction manual attached by the manufacturer of the measuring machine. Specifically, almost the entire region of the front and back sides of the object to be polished was determined in a measuring spatial filtering wavelength of 0.88 to 7.8 μm, to give a value for the surface roughness (TMS-Ra) (Å).

TABLE 2

| Ex. No. | Surface Roughness (TMS-Ra) (Å) |
|---|---|
| Ex. 1 | 0.57 |
| Ex. 2 | 0.58 |
| Ex. 3 | 0.63 |
| Ex. 4 | 0.65 |
| Ex. 5 | 0.61 |

TABLE 2-continued

| | Surface Roughness (TMS-Ra) (Å) |
|---|---|
| Ex. 6 | 0.70 |
| Ex. 7 | 0.58 |
| Ex. 8 | 0.61 |
| Ex. 9 | 0.61 |
| Ex. 10 | 0.61 |
| Comp. Ex. No. | |
| Comp. Ex. 1 | 1.10 |
| Comp. Ex. 2 | 0.88 |
| Comp. Ex. 3 | 0.95 |
| Comp. Ex. 4 | 0.97 |
| Comp. Ex. 5 | 0.92 |
| Comp. Ex. 6 | 0.97 |
| Comp. Ex. 7 | 1.00 |

It can be seen from the results of Table 2 that the polishing compositions of Examples 1 to 10 showed more reduced surface roughness (TMS-Ra) of the surface of the object to be polished as compared to those of Comparative Examples 1 to 7.

According to the polishing composition of the present invention, a substrate for a disk having satisfactory surface smoothness for practical use with reduced surface roughness (TMS-Ra) can be efficiently obtained.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polishing composition for memory hard disk having a pH of from 1 to 4.5 comprising water and an abrasive consisting essentially of silica particles, in which a relationship of a particle size (R) in nm at a range of from 40 to 45 nm and a cumulative volume frequency % (V) in a graph of particle size-cumulative volume frequency obtained by plotting a cumulative volume frequency (%) of the silica particles counted from a small particle size side satisfy the relationship where the cumulative volume frequency (V) in % is determined to be equal to or greater than the sum of the particle size (R) in nm plus 50,
wherein the silica particles have a particle size distribution wherein silica particles having a size of from 10 to less than 40 nm are present in said composition, and
wherein the particle size is determined by observation with a transmission electron microscope (TEM).

2. The polishing composition according to claim 1, wherein the silica particles are colloidal silica particles.

3. The polishing composition according to claim 1, further comprising at least one member selected from the group consisting of acids, salts thereof and oxidizing agents.

4. The polishing composition according to claim 2, further comprising at least one member selected from the group consisting of acids, salts thereof and oxidizing agents.

5. A process for reducing surface roughness (TMS-Ra) of a substrate for memory hard disk comprising the step of polishing a substrate for memory hard disk with the polishing composition of claim 1.

6. A process for reducing surface roughness (TMS-Ra) of a substrate for memory hard disk comprising the step of polishing a substrate for memory hard disk with the polishing composition of claim 2.

7. A process for reducing surface roughness (TMS-Ra) of a substrate for memory hard disk comprising the step of polishing a substrate for memory hard disk with the polishing composition of claim 3.

8. A process for reducing surface roughness (TMS-Ra) of a substrate for memory hard disk comprising the step of polishing a substrate for memory hard disk with the polishing composition of claim 4.

9. A method for manufacturing an Ni—P plated substrate for memory hard disk, comprising the step of polishing an Ni—P plated substrate for memory hard disk with the polishing composition of claim 1.

10. A method for manufacturing an Ni—P plated substrate for memory hard disk, comprising the step of polishing an Ni—P plated substrate for memory hard disk with the polishing composition of claim 2.

11. A method for manufacturing an Ni—P plated substrate for memory hard disk, comprising the step of polishing an Ni—P plated substrate for memory hard disk with the polishing composition of claim 3.

12. A method for manufacturing an Ni—P plated substrate for memory hard disk, comprising the step of polishing an Ni—P plated substrate for memory hard disk with the polishing composition of claim 4.

* * * * *